(12) United States Patent
Fröhling et al.

(10) Patent No.: US 6,969,094 B2
(45) Date of Patent: Nov. 29, 2005

(54) TUBE COUPLING

(75) Inventors: Jörn Fröhling, Köln (DE); Stefan Sturm, Düsseldorf (DE); Frank Obrist, Dornbirn (AT); Peter Kuhn, Weinheim (DE); Stefan Kröss, Dorbirn (AT)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/739,861

(22) Filed: Dec. 18, 2003

(65) Prior Publication Data

US 2004/0178631 A1    Sep. 16, 2004

(30) Foreign Application Priority Data

Dec. 20, 2002   (DE) ................. 102 61 887

(51) Int. Cl.[7] ............................................ F16L 35/00
(52) U.S. Cl. ..................... 285/205; 285/379; 285/328; 285/363
(58) Field of Search .................. 285/124.1–125.5, 285/205, 206, 363, 368, 379, 328

(56) References Cited

U.S. PATENT DOCUMENTS

| | | | |
|---|---|---|---|
| 1,099,129 A * | 6/1914 | Robinson ................... 285/347 |
| 1,848,307 A * | 3/1932 | Boynton ..................... 277/329 |
| 3,448,986 A * | 6/1969 | Dial et al. .................. 277/596 |
| 4,659,091 A * | 4/1987 | Baasner et al. ............. 428/34.5 |
| 4,861,077 A * | 8/1989 | Welkey .................... 285/334.1 |
| 5,145,219 A * | 9/1992 | Babuder .................... 285/330 |
| 5,308,125 A * | 5/1994 | Anderson, Jr. ............. 285/349 |
| 5,372,390 A | 12/1994 | Conway et al. |
| 5,556,138 A | 9/1996 | Nakajima et al. |
| 5,853,201 A | 12/1998 | Izumi et al. |
| 5,904,381 A * | 5/1999 | Ohmi et al. ................ 285/328 |
| 6,161,875 A * | 12/2000 | Yamaji et al. ............... 285/24 |
| 6,227,575 B1 * | 5/2001 | Monning et al. ............ 285/41 |
| 6,273,477 B1 * | 8/2001 | Ohmi et al. ................ 285/328 |
| 6,328,351 B1 | 12/2001 | Kato et al. |
| 6,386,593 B1 * | 5/2002 | Slais et al. .................. 285/205 |
| 6,676,167 B2 * | 1/2004 | Schroeder et al. .......... 285/205 |
| 2003/0080554 A1 * | 5/2003 | Schroeder et al. ....... 285/125.1 |

FOREIGN PATENT DOCUMENTS

| | | |
|---|---|---|
| DE | 32 22 937 | 12/1983 |
| FR | 20700 193 | 10/1993 |
| JP | 2000-291859 | 10/2000 |
| WO | WO 01/98690 A1 | 12/2001 |

* cited by examiner

*Primary Examiner*—Eric K. Nicholson
(74) *Attorney, Agent, or Firm*—Brinks Hofer Gilson Lione

(57) ABSTRACT

A tube coupling for the detachable coupling of tube line sections of a high-pressure tubing system. The tube coupling includes two coupling blocks held together by a clamping screw, whereby one of the coupling blocks has a coupling plug that engages a plug socket provided on the other coupling block. A sealing ring is formed of a plastically deformable material and is enclosed between a front face of the coupling plug and a bottom-side sealing surface of the plug socket. In order to protect the sealing ring from being lost, damages and/or contaminated during assembly or opening and closing the coupling, in a preassembled condition it is enclosed within a protective socket. To homogeneously load the sealing ring, the sealing ring is located at one point of a supporting triangle, the two other supporting points of being formed by a pair of supporting surfaces arranged side by side at an outer end of side flanges of the coupling blocks.

16 Claims, 2 Drawing Sheets

TUBE COUPLING

BACKGROUND OF THE INVENTION

1. Field of the Invention

The invention relates to a tube coupling for vehicle air conditioning units.

2. Related Technology

Tube couplings of this type are used, for example, in the tubing system of vehicle air conditioning units. Prior art systems using Freon or R134a as the refrigerant employ tube couplings with one or two O-rings arranged on the coupling plug in grooves.

Due to the arrangement of at least one groove and the conical plug end, a length of the coupling plug results such that, for assembling and disassembling of a tube line section, the metallic tube line section concerned must be correspondingly bent-up. In addition, because of the machining process necessary to form the plug on an extruded profile, the manufacture of the coupling plug requires an effort dependent on the plug length.

O-rings also have the disadvantage of seizing on sealing surfaces due to ageing. The sudden release of the corresponding adhesive forces under the pressure of the confined medium, after unfastening the clamping screw, causes significant danger. The necessary elasticity of the O-rings is advantageous in that they can be easily mounted in the coupling plug's grooves, but the required elastic material of the rings has the disadvantage of a limited sealing effect because of diffusion to be expected, particularly at higher pressures and when sealing certain gases, such as when sealing $CO_2$-systems. When O-ring seals are used in tube couplings exposed to extremely high pressures, there is a danger that the elastic sealing material will be extruded from the sealing groove, particularly when bending forces act on the tube coupling. Further, O-rings in tube couplings are disadvantageous in that the pressure of the medium to be sealed is applied to an area essentially larger in radial direction compared to the area corresponding to the inner diameter of the tubing system so that the tube coupling is exposed to correspondingly high axial forces and must be dimensioned highly massive. Finally, there is a danger that on closing and opening of the tube coupling, the coupling plug, inclusive of its O-ring and hence also sealing surfaces of the coupling socket, may become contaminated or damaged.

BRIEF SUMMARY OF THE INVENTION

The present invention provides a tube coupling which avoids the above mentioned disadvantages of known tube couplings, reliably seals against especially high pressures and, being compact, can be manufactured easily and operated simply and safely during opening and closing. According to the invention, these problems have been solved by providing a tube coupling for the detachable coupling of the tube-line sections of a high-pressure tubing system. The tube coupling includes a pair of coupling blocks, one of which includes a coupling plug and the other of which includes a plug socket. The coupling blocks are held together by a clamping screw extended between side flanges. A sealing ring is arranged at a front face of the coupling plug, whereby the sealing ring is secured in this arrangement by a protective socket that encloses the sealing ring and the coupling plug.

BRIEF DESCRIPTION OF THE DRAWINGS

Advantageous embodiments of the invention are described in the claims and can be learned from the following description of an example of embodiment and also by the accompanying drawings, of which show:

DETAILED DESCRIPTION OF THE INVENTION

Figure 1:
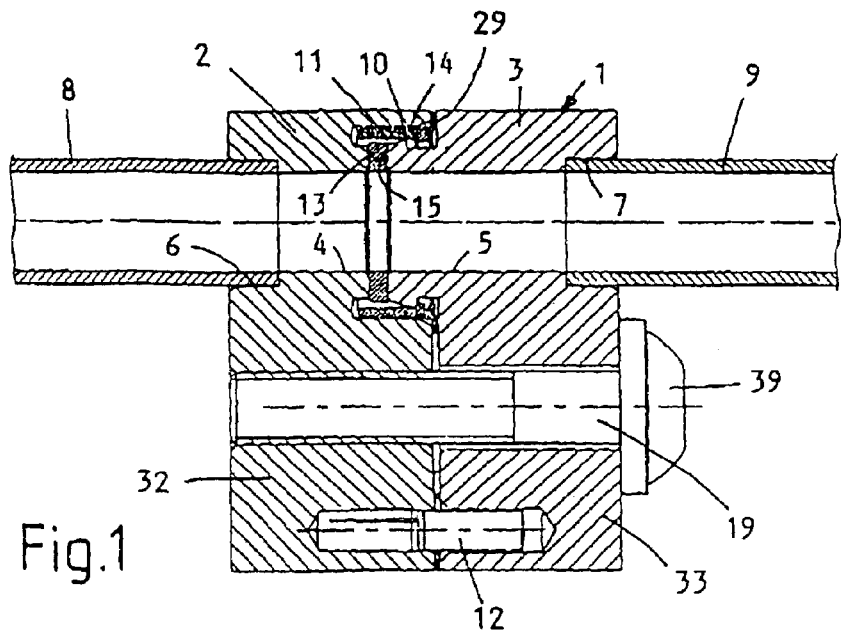
FIG. 1 illustrates, in cross-section, a tube coupling embodying the principles of the present invention and having coupling blocks, a clamping screw and a positioning pin.

Referring now to FIG. 1, a tube coupling 1 embodying the principles of the present invention generally includes two cuboid-shaped coupling blocks 2, 3 cut from an extruded profile, with through holes 4, 5, and which forms part of a high-pressure tubing system. Outwardly these holes 4, 5 merge with expanded diameters into tube sockets 6, 7 into which the free ends of metallic tube line section 8, 9 that are to be connected are inserted and brazed. These tube line sections 8, 9 are, for example, part of a $CO_2$-air conditioning unit installed in the engine compartment of a vehicle so that the tubing system must be capable of safely withstanding pressures of more than 150 bar.

One of the coupling blocks 3 has a coupling plug 10 projecting in direction of the tube axis, which is received within and enclosed by a plug socket 11 formed on the other coupling block 2. This plug engagement, together with a positioning pin 12 provided in the opposing end regions of the coupling blocks 2, 3, ensures the functional alignment of the coupling blocks 2, 3 and the respective tube line section 8, 9, particularly during assembly of the tubing system or reclosing of the tube coupling. The plug engagement also provides a protected position of the sealing ring 13 for the tube coupling with the plug socket 11.

The coupling plug 10 further functions to support a protective socket 14 that before and during assembly of the tube coupling, holds the sealing ring 13 in a centered position relative to a front face 15 of the coupling plug 10 and that additionally seals the plug socket 11 from the exterior against the entering of dirt or other debris. The sealing ring 13 fixed to the front face 15 of the coupling plug by the protective socket 14 has the shape of a flat seal, and thus a generally rectangular cross-section, and consists, for example, of a soft metal so that circumferential sealing profiles 17, 18 can be impressed in the sealing ring 13 and provided on both the radial sealing surface 16 of the plug socket 11 and the front face 15 of the coupling plug. Compared with a common O-ring seal, there are, among others, the advantages that fine machining of sealing surfaces can be avoided; that an impermeable, inelastic sealing material can be used; and that the sealing force can be generated by the clamping screw 19 of the tube coupling, which involves the advantage that the tube coupling can be opened after unfastening of the clamping screw 19 with no danger.

Figure 2:
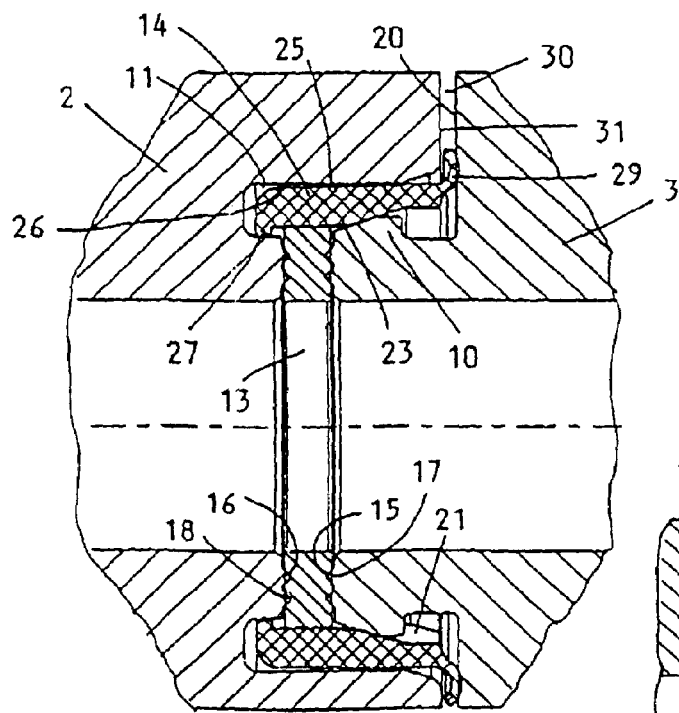
FIG. 2 illustrates an enlarged cross-sectional view in the sealing area of the tube coupling seen in FIG. 1.

The sealing profiles 17, 18 are formed as, for example, edge-shaped circumferential ribs, generally triangular in cross-section. In the example according to FIG. 2, two concentric profiles are formed in each of the sealing ring 13 to abut the front face 15 of the coupling plug 10 and to abut the circumferential sealing surface 16 in the bottom area of the plug socket 11. Reversing the profile arrangement, the profiles can also be provided in the sealing ring 13, on condition that its material is much harder than that of the coupling blocks 2, 3. Because the coupling blocks 2, 3 are preferably manufactured from a section of an extruded profile, they are formed for example, of an aluminum alloy.

Figure 5:
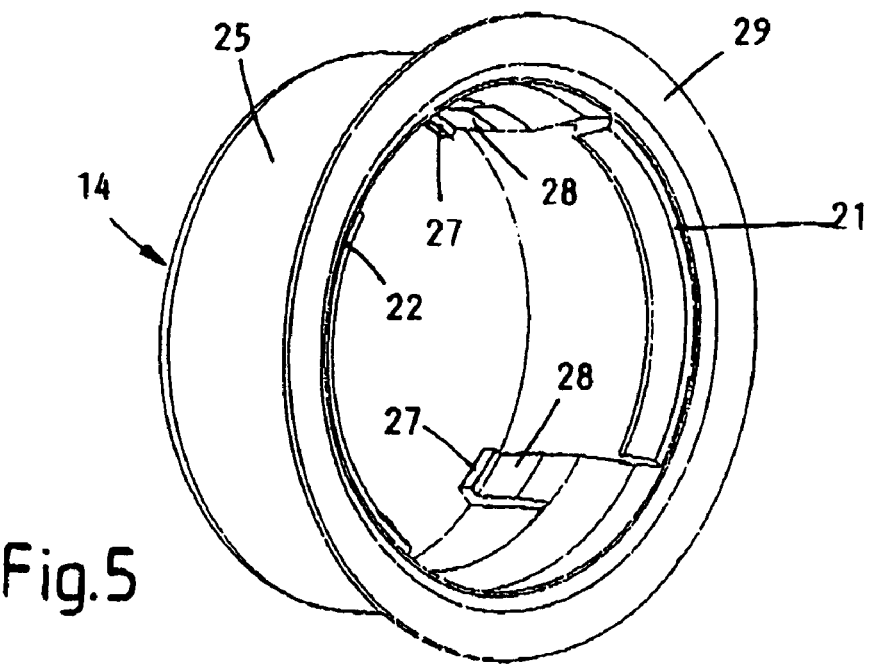
FIG. 5 is an enlarged perspective view of the protective socket of the tube coupling according to FIG. 1.

A first example of embodiment of the protective socket 14 mentioned above can be seen in the representations of FIGS. 2 and 5. In the region of its rear end, adjacent to a front face 20 of the coupling block 3, the protective socket 14 has two diametrically opposing arced holding rims 21, 22 with nose-shaped cross-sections outbound to the exterior or rear, respectively, so that after expansion of the protective socket 14 by a conical front region 23 of the coupling plug 10, the holding rims 21, 22 will "snap over" the coupling plug 10 and engage in a rear circumferential holding groove 24 formed at the base of the plug 10 and that is adjacent to the front face 20 of the coupling block 3. The outer surface 25 of the protective socket 14, which is, for example, manufactured as a plastic injection-molded part, is cylindrical or slightly conical so that it centers itself and, hence, also the coupling plug 10 related to the cylindrical or slightly conical inner surface 26 of the plug socket 11.

In order to also center the sealing ring 13, the sealing ring 13 is engaged, for example, by four holding noses 27 formed in the protective socket 14 in the region of the front rim of the protective socket 14, and held at its perimeter by adjoining axial webs 28, which are in the form of ribs adjacent to the holding noses 27. Since the sealing ring 13 is held backwardly offset to the front end of the protective socket 14 and enclosed within the protective socket 14, its sealing surface, which can easily be damaged, is protected from mechanical impacts and effects in the disassembled condition of the tube coupling and is secured from being lost during assembly.

Further, the protective socket 14 has a circumferential sealing lip 29 formed its rear rim. The sealing lip 29 projects like a flange outwardly from the protective socket 14 so that it engages in the gap space 30 between the front faces 20, 31 of the coupling blocks 2, 3 and thus protects the sealing arrangement from the entrance of dirt from the outside. Preferably the sealing lip 29 has an arced cross-section so that it sealingly adapts to the width of the gap space 30 by elastic deformation. The arrangement described of the sealing ring 13 with its protective socket 14 shows that the coupling plug 10 can be specifically dimensioned short, for it only functions to hold and position the protective socket 14 so that the protective socket 14 can hold the sealing ring 13 centered at the front face 15 of the coupling plug 10 in a protected position suitable for assembly.

Figure 6:
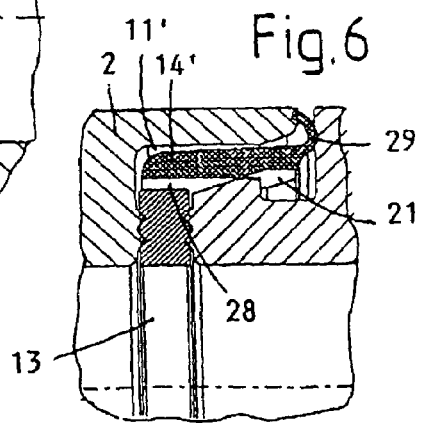
FIG. 6 is another embodiment of the protective socket, in a partial cross-sectional view of the sealing arrangement.
Figure 3:
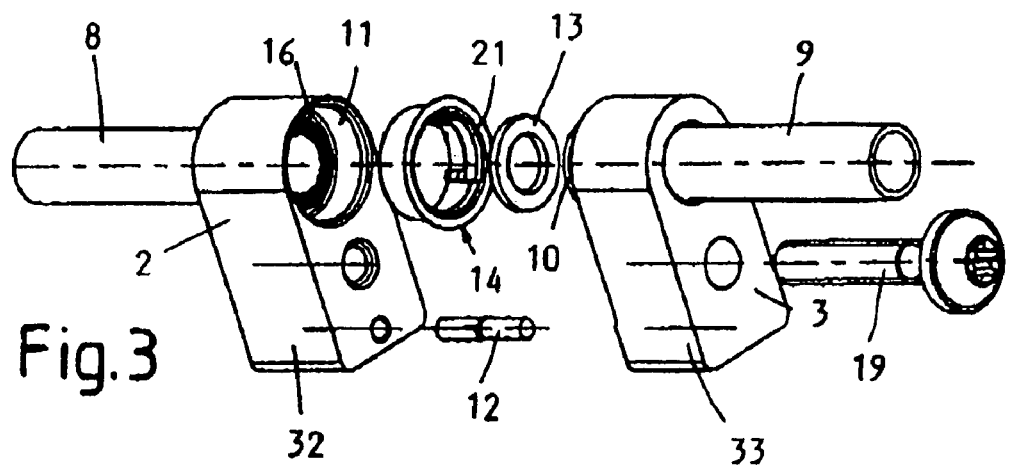
FIGS. 3 and 4 are perspective representations of parts of the tube coupling according to FIG. 1 in a demounted, but axially properly arranged view with, in FIG. 4, the sealing ring shown preassembled in the protective socket and the socket preassembled on the coupling plug.
Figure 4:
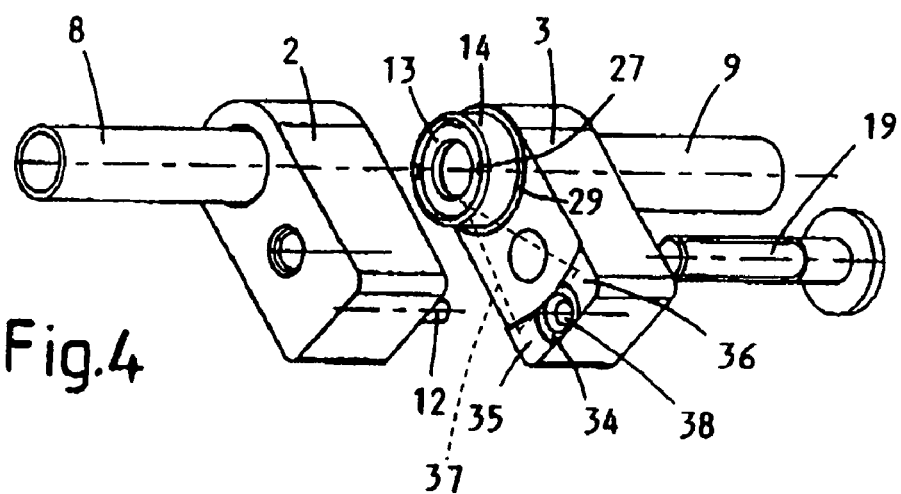

The other example of embodiment of the protective socket 14', as seen in FIG. 6, differs from the previous embodiment in that the holding noses 27 are omitted so that the protective socket 14' and therefore also the plug socket 11' can be made even shorter. Instead, the sealing ring 13 is inserted between the axial webs 28 and held by them under pretension in a finger-grip manner.

In order to avoid angular deviations between the coupling blocks 2, 3 and therefore the sealing front faces 15, 16 adjacent to the sealing ring 13, due to transverse forces acting on the tube sections 8, 9 in different directions that may affect sealing, the surfaces that will be adjacent are arranged at the outer end of the side flanges 32, 33 away from the sealing arrangement, and in addition, is symmetrically divided into two partial surfaces 35, 36 by a recess 34. Therefore, the pressing-in region of the sealing ring 13 between the sealing front faces 15, 16 at the front face of the coupling plug 10 and in the plug socket 11 forms a point of symmetric supporting triangle 37, the two other points of which are created by the partial surfaces 35, 36.

The clamping screw 19 is located in the region of the center of gravity of this triangle and, due to its location, maintains sealing pressure at the sealing ring 13. The recess 34 between the partial surfaces 35, 36 can be made, for example, by chamfering the pin socket hole 38.

The clamping screw 19 has with its screw head 39 an adjoining surface as large as possible at the side flange 33 in order to counteract flange bending, so that the flange can be made correspondingly thinner. A further enlargement of this surface, through which the clamping force acts on the side flange 33, can be obtained by use of a washer (not shown). In addition, a suitable disk shape of the washer can lead to a disk spring function of the washer so that the region of possible elastic deformation without release of a homogeneous sealing force at the sealing ring 13 is enlarged. The opposing end of the clamping screw 19 is provided with threads that engage a correspondingly threaded bore in the side flange 32.

The positioning pin 12 seats tightly in one of the side flanges 32, 33, between the partial surfaces 35, 36 at the optimal position, and engages with a seating hole 38 in the adjoining side flange 32, 33 realizing a snug fit. During assembling of the tube coupling 1, this fit ensures the accurate alignment of the coupling blocks 2, 3 to each other and prevents tilting and twisting when the plug socket 11 is slided up over the coupling plug 10 and the protective socket 14 of the coupling plug 10. Also the removal of the coupling blocks 2, 3 one from the other parallel to the axis to diassemble the tube coupling 1 is performed while being supported by the positioning pin 12. It is clear that a mutual positioning engagement of the side flanges 32, 33 before the flange connection is closed can also be obtained by another design of a projection at one side flange 32 engaged with a corresponding recess at the other side flange 33, which is different but corresponds to the action of the positioning pin 12.

The foregoing discussion discloses and describes a preferred embodiment of the invention. One skilled in the art will readily recognize from such discussion, and from the accompanying drawings and claims, that changes and modifications can be made to the invention without departing from the true spirit and fair scope of the invention as defined in the following claims.

What is claimed is:

1. A tube coupling for the detachable coupling of tube line sections in a high-pressure tubing system, comprising:
    a pair of coupling blocks one of which one has a coupling plug and the other of which has a plug socket for receiving the coupling plug, the coupling blocks including side flanges held together by a clamping screw; and
    a sealing ring arranged at a front face of the coupling plug, the sealing ring being supported by a protective socket enclosing the sealing ring and the coupling plug, the protective socket including portions adjacent to a rear end of the protective socket, the portions defining a circumferential sealing lip provided and engaged between the coupling blocks circumferentially around the coupling plug.

2. A tube coupling according to claim 1, wherein the sealing ring includes a ribbed sealing surface engaging at least one of the coupling blocks.

3. A tube coupling according to claim 2 wherein the ribbed sealing surface contacts both a front face of the coupling plug and a radial sealing surface of the plug socket.

4. A tube coupling according to claim 1 wherein the sealing ring is formed of a plastically deformable material.

5. A tube coupling according to claim 1 wherein the sealing ring is made of a soft metal relative to said coupling blocks.

6. A tube coupling according to claim 1 wherein the protective socket is made of an elastically deformable material.

7. A tube coupling according to claim 1 wherein the coupling plug includes portions defining a holding groove, the protective socket including portions defining a retaining profile that engages the holding groove.

8. A tube coupling according to claim 7 wherein the sealing ring is held positively in the protective socket.

9. A tube coupling according to claim 8 wherein to hold the sealing ring positively at the coupling plug, a plurality of inwardly directed holding noses are provided in a front edge region of the protective socket, which grip over the sealing ring in its engaged position.

10. A tube coupling according to claim 1 wherein at least one of the side flanges includes a step defining at their outer end away from the sealing arrangement between the coupling plug sealing ring and coupling socket two partial surfaces, the partial surfaces being separated by a recessed portion therebetween so that the partial surfaces together with a sealing arrangement to form a symmetrical supporting triangle, whereby the clamping screw is provided in the region of the center of this triangle and an axis of the tube lines and an axis of the clamping screw run in a common plane.

11. A tube coupling according to claim 10 wherein a positioning pin is provided between the partial surfaces.

12. A tube coupling for the detachable coupling of tube line sections in a high-pressure tubing system, comprising:

a pair of coupling blocks one of which one has a coupling plug and the other of which has a plug socket for receiving the coupling plug, the coupling blocks including side flanges held together by a clamping screw; and a sealing ring arranged at the front face of the coupling plug, the sealing ring being supported by a protective socket enclosing the sealing ring and the coupling plug;

wherein at least one of the side flanges includes a step defining two partial surfaces engaging the other of the at least one of the side flanges, the partial surfaces located adjacent to an outer end of the at least one of the side flanges, the partial surfaces being separated by a recessed portion therebetween so that the partial surfaces together with a sealing arrangement to form a symmetrical supporting triangle, whereby the clamping screw is provided in the region of the center of the triangle and an axis of the tube lines and an axis of the clamping screw run in a common plane.

13. A tube coupling according to claim 12 wherein the coupling plug includes portions defining a holding groove, the protective socket including portions defining a retaining profile that engages the holding groove.

14. A tube coupling according to claim 13 wherein the sealing ring is held positively in the protective socket.

15. A tube coupling according to claim 14 wherein to hold the sealing ring positively at the coupling plug, a plurality of inwardly directed holding noses are provided in a front edge region of the protective socket, which grip over the sealing ring in its engaged position.

16. A tube coupling according to claim 12 wherein a positioning pin is provided between the partial surfaces.

* * * * *